US011138523B2

(12) United States Patent
Chowdhury et al.

(10) Patent No.: US 11,138,523 B2
(45) Date of Patent: Oct. 5, 2021

(54) GREEDY ACTIVE LEARNING FOR REDUCING LABELED DATA IMBALANCES

(71) Applicant: International Business Machines Corporation, Armonk, NY (US)

(72) Inventors: Md Faisal M. Chowdhury, Corona, NY (US); Sarthak Dash, Jersey City, NJ (US); Alfio M. Gliozzo, Brooklyn, NY (US)

(73) Assignee: International Business Machines Corporation, Armonk, NY (US)

( * ) Notice: Subject to any disclaimer, the term of this patent is extended or adjusted under 35 U.S.C. 154(b) by 580 days.

(21) Appl. No.: 15/220,895

(22) Filed: Jul. 27, 2016

(65) Prior Publication Data

US 2018/0032900 A1    Feb. 1, 2018

(51) Int. Cl.
*G06N 20/10*   (2019.01)
*G06N 20/00*   (2019.01)
*G06F 16/951*  (2019.01)
*G06F 16/2452* (2019.01)
(Continued)

(52) U.S. Cl.
CPC ....... *G06N 20/10* (2019.01); *G06F 16/24522* (2019.01); *G06F 16/951* (2019.01); *G06F 40/30* (2020.01); *G06N 5/04* (2013.01); *G06N 20/00* (2019.01)

(58) Field of Classification Search
CPC .. G06N 20/00; G06N 7/005; G06F 16/24522; G06F 16/951; G06F 17/2785
See application file for complete search history.

(56) References Cited

U.S. PATENT DOCUMENTS

| | | | |
|---|---|---|---|
| 7,958,067 B2 | 6/2011 | Schmidtler et al. | |
| 8,346,534 B2 * | 1/2013 | Csomai | G06F 40/169 704/1 |
| 9,292,797 B2 | 3/2016 | He et al. | |

(Continued)

OTHER PUBLICATIONS

Tsai, Richard Tzong-Han, et al. "Exploiting likely-positive and unlabeled data to improve the identification of protein-protein interaction articles." BMC bioinformatics. vol. 9. No. 1. BioMed Central, 2008. (Year: 2008).*

(Continued)

*Primary Examiner* — Li B. Zhen
*Assistant Examiner* — Henry Nguyen
(74) *Attorney, Agent, or Firm* — Terrile, Cannatti & Chambers, LLP; Stephen A. Terrile

(57) ABSTRACT

A method, system and computer-usable medium are disclosed for reducing labeled data imbalances when training an active learning system. The ratio of instances having positive labels or negative labels in a collection of labeled instances associated with an input category used for learning is determined. A first instance for annotation is selected from a collection of unlabeled instances if a first threshold for negative instances, and a first threshold confidence level of being a positive instance of the input category, have been met. A second instance for annotation is selected if a second threshold for positive instances, and a second threshold confidence level of being a negative instance of the input category, have been met. The first and second instances are respectively annotated with a positive and negative label and added to the collection of labeled instances, which are then used for training.

26 Claims, 10 Drawing Sheets

(51) Int. Cl.
  *G06N 5/04* (2006.01)
  *G06F 40/30* (2020.01)

(56) References Cited

U.S. PATENT DOCUMENTS

| | | | | |
|---|---|---|---|---|
| 2007/0239638 | A1* | 10/2007 | Zhuang | G06F 16/353 |
| | | | | 706/20 |
| 2007/0265991 | A1* | 11/2007 | Collobert | G06K 9/6269 |
| | | | | 706/16 |
| 2008/0059449 | A1 | 3/2008 | Webster et al. | |
| 2008/0071840 | A1* | 3/2008 | Srikanth | G06F 16/2255 |
| 2008/0147574 | A1 | 6/2008 | Chidlovskii | |
| 2008/0162455 | A1* | 7/2008 | Daga | G06F 16/313 |
| 2009/0125381 | A1* | 5/2009 | Delepet | G06Q 30/02 |
| | | | | 705/7.29 |
| 2010/0145678 | A1* | 6/2010 | Csomai | G06F 17/241 |
| | | | | 704/9 |
| 2011/0313779 | A1 | 12/2011 | Herzog et al. | |
| 2012/0095943 | A1 | 4/2012 | Yankov et al. | |
| 2012/0278332 | A1 | 11/2012 | Wang et al. | |
| 2015/0339591 | A1* | 11/2015 | Cook | G06N 20/00 |
| | | | | 706/12 |
| 2017/0116544 | A1* | 4/2017 | Johnson | G06N 20/00 |
| 2017/0351710 | A1 | 12/2017 | Zhu et al. | |

OTHER PUBLICATIONS

High, R., "The Era of Cognitive Systems: An Inside Look at IBM Watson and How it Works," IBM Redbooks, 2012.

Yuan et al., "Watson and Healthcare," IBM developerWorks, 2011.

IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.

Tong, S. et al., "Support vector machine active learning with applications to text classification," The Journal of Machine Learning Research, vol. 2, pp. 45-66, 2002.

Tong, S. et al., "Support vector machine active learning for image retrieval," Proceedings of the Ninth ACM International Conference on Multimedia, pp. 107-118, 2001.

Nguyen, H.T. et al., "Active learning using pre-clustering," Proceedings of the 21st International Conference on Machine Learning, p. 623-630, 2004.

Cohn, D.A. et al., "Active Learning with Statistical Models," Journal of Artificial Intelligence Research, vol. 4, pp. 129-145, 1996.

Settles, B., "Active Learning Literature Survey," Computer Sciences Technical Report 1648, University of Wisconsin—Madison, 2010.

Dasgupta, S. et al., "Hierarchical Sampling for Active Learning," Proceedings of the 25th International Conference on Machine Learning, pp. 208-215, 2008.

Lewis, D. et al., "A sequential algorithm for training text classifiers," Proceedings of the ACM SIGIR Conference on Research and Development in Information Retrieval, pp. 3-12. ACM/Springer, 1994.

* cited by examiner

GREEDY ACTIVE LEARNING FOR REDUCING LABELED DATA IMBALANCES

BACKGROUND OF THE INVENTION

Field of the Invention

The present invention relates in general to the field of computers and similar technologies, and in particular to software utilized in this field. Still more particularly, it relates to a method, system and computer-usable medium for reducing labeled data imbalances when training an active learning system for a Natural Language Processing (NLP) task.

Description of the Related Art

The use of machine learning, a sub-field of artificial intelligence (AI) that provides computers with the ability to learn without being explicitly programmed to do so, has become more prevalent in recent years. In general, there are three common approaches to machine learning: supervised, unsupervised, and semi-supervised. In supervised machine learning approaches, the computer is provided example inputs consisting of manually-labeled training data, and their desired outputs, with the goal of generating general rules and features that can subsequently be used to associate a given input with a corresponding output. In contrast, unsupervised learning approaches do not use training data to learn explicit features. Instead, these approaches infer functions to discover non-obvious or hidden structures within unlabeled data. Alternatively, semi-supervised approaches to machine learning typically use a small amount of labeled data in combination with a large amount of unlabeled data for training.

While unlabeled data is abundant, manually labeling it for supervised machine learning can be time consuming, tedious, and expensive. Active learning, a form of semi-supervised machine learning, addresses this issue through the implementation of a learning algorithm that interactively queries a user, or other information source, to obtain labels for a subset of unannotated input data. In such active learning approaches, the learner typically chooses the examples to be labeled. As a result, the number of examples needed to learn a concept may be lower than the number of examples needed for typical supervised learning approaches.

For example, an active learner may attempt to select the most informative example, which is the example the learner is most uncertain of, from a pool of unlabeled example instances. In this example, the learner typically begins with a small number of instances, known as seeds, in the labeled training set L. It then requests labels for one or more carefully selected instances from a training set of unlabeled examples, learns from the corresponding query results, and then utilizes its new knowledge to choose which instances to query next. The resulting, newly-labeled instances are then added to the labeled training set L until some stopping criteria is met, at which time the learner proceeds in a typical supervised learning manner. However, there is a risk that the algorithm may be overwhelmed by an imbalanced distribution of positive and negative examples in the unlabeled training set. For example, only a few of those examples may warrant a positive label. As a result, there is a good possibility the annotator will label a given example as negative whenever the learner chooses the most informative instance. Consequently, there is a possibility that the learner may generate an unbalanced preponderance of negative labels, which is not only time consuming for the annotator, but may result in less than optimal machine learning performance and effectiveness as well.

SUMMARY OF THE INVENTION

A method, system and computer-usable medium are disclosed for reducing labeled data imbalances when training an active learning system for a Natural Language Processing (NLP) task. In certain embodiments, the disclosure relates to a computer-implemented method for active machine learning, comprising: determining the ratio of positive instances to negative instances in a collection of labeled instances associated with an input category, the positive and negative instances being annotated accordingly and used for learning; selecting a first instance for annotation from a collection of unlabeled instances if a first threshold for negative instances has been met, the first instance meeting a first threshold confidence level of being a positive instance of the input category; and selecting a second instance for annotation from the collection of unlabeled instances if a second threshold for positive instances has been met, the second instance meeting a second threshold confidence level of being a negative instance of the input category.

In certain embodiments, the disclosure relates to a system comprising: a processor; a data bus coupled to the processor; and a computer-usable medium embodying computer program code, the computer-usable medium being coupled to the data bus, the computer program code used for using a contextual graph to summarize a corpus of content and comprising instructions executable by the processor and configured for: determining the ratio of positive instances to negative instances in a collection of labeled instances associated with an input category, the positive and negative instances being annotated accordingly and used for learning; selecting a first instance for annotation from a collection of unlabeled instances if a first threshold for negative instances has been met, the first instance meeting a first threshold confidence level of being a positive instance of the input category; and selecting a second instance for annotation from the collection of unlabeled instances if a second threshold for positive instances has been met, the second instance meeting a second threshold confidence level of being a negative instance of the input category.

In certain embodiments, the disclosure relates to a non-transitory, computer-readable storage medium embodying computer program code, the computer program code comprising computer executable instructions configured for: determining the ratio of positive instances to negative instances in a collection of labeled instances associated with an input category, the positive and negative instances being annotated accordingly and used for learning; selecting a first instance for annotation from a collection of unlabeled instances if a first threshold for negative instances has been met, the first instance meeting a first threshold confidence level of being a positive instance of the input category; and selecting a second instance for annotation from the collection of unlabeled instances if a second threshold for positive instances has been met, the second instance meeting a second threshold confidence level of being a negative instance of the input category.

In certain embodiments, the method, system and computer readable medium may include one or more of the following aspects. More specifically, in certain embodiments, the first instance is an unlabeled instance having a highest confidence level of being a positive instance for the input category; and the second instance is an unlabeled instance having a highest confidence level of being a negative instance for the input category. In certain embodiments, the first threshold is a ratio of a number of labeled negative instances divided by a number of labeled positive instances; and the second threshold is a ratio of a number of labeled positive instances divided by a number of labeled negative instances. In certain embodiments, the classification of an unlabeled instance as a negative or a positive instance is performed by a semantic search technique. In certain embodiments, the semantic search technique is performed by using distributional semantics and a search engine. In certain embodiments, the operation further includes the classification is also performed in part by a machine learning based supervised classifier. In certain embodiments, the operation further includes annotating the first instance with a positive label, the annotated first instance added to the collection of labeled instances; and annotating the second instance with a negative label, the annotated second instance added to the collection of labeled instances. In certain embodiments, the operation further includes using the collection of annotated instances to train a machine learning system if a relatively equal number of positive instances and negative instances have been annotated. Some or all of these aspects enable positive or negative instances to be automatically selected for annotation from a collection of unlabeled instances, which advantageously results in reducing labeled data imbalances when training an active learning system for a Natural Language Processing (NLP) task.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
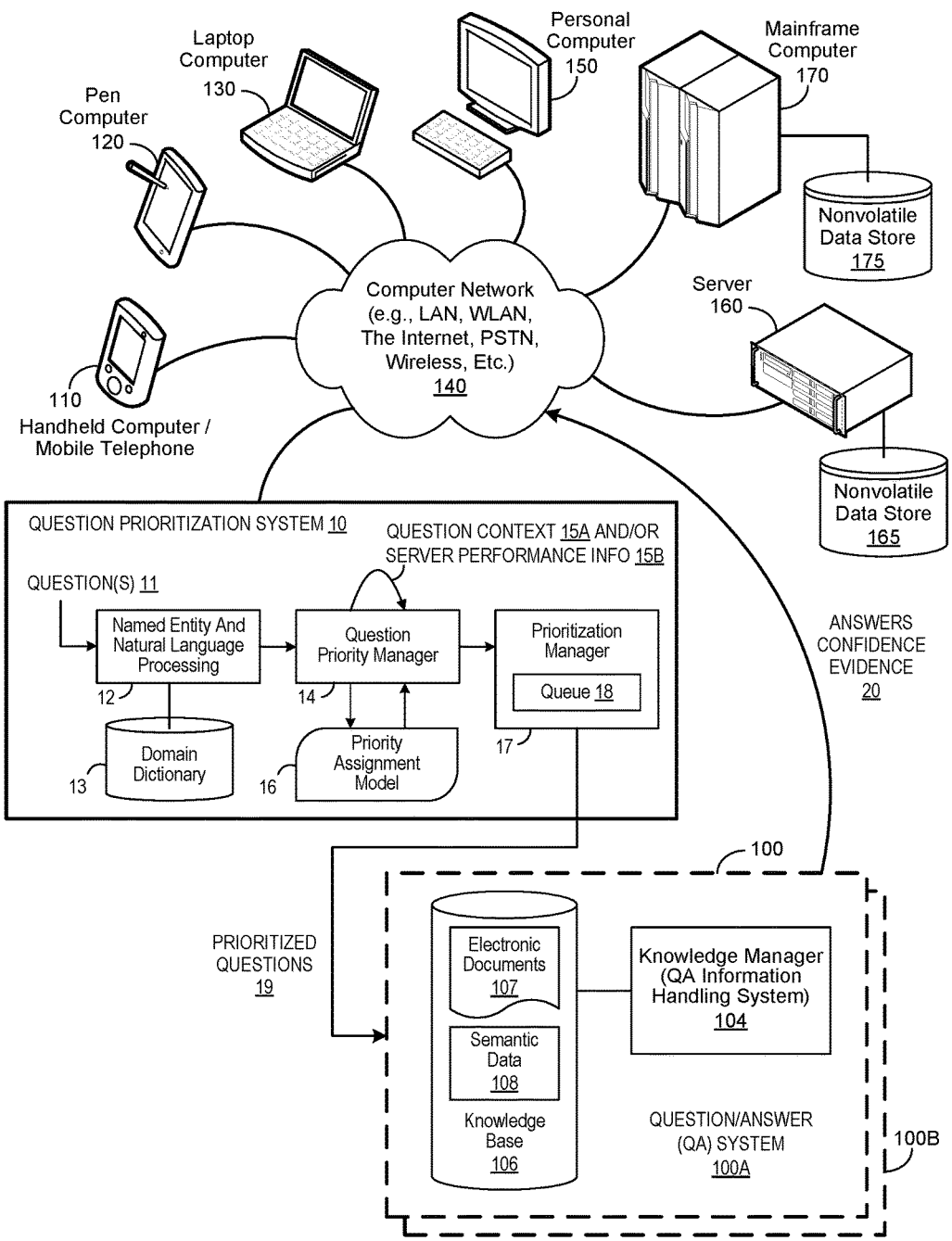
FIG. 1 depicts an exemplary client computer in which the present invention may be implemented.

A method, system and computer-usable medium are disclosed for reducing labeled data imbalances when training an active learning system for a Natural Language Processing (NLP) task. The present invention may be a system, a method, and/or a computer program product. In addition, selected aspects of the present invention may take the form of an entirely hardware embodiment, an entirely software embodiment (including firmware, resident software, microcode, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a question prioritization system 10 and question/answer (QA) system 100 connected to a computer network 140. The QA system 100 includes a knowledge manager 104 that is connected to a knowledge base 106 and configured to provide question/answer (QA) generation functionality for one or more content users who submit across the network 140 to the QA system 100. To assist with efficient sorting and presentation of questions to the QA system 100, the prioritization system 10 may be connected to the computer network 140 to receive user questions, and may include a plurality of subsystems which interact with cognitive systems, like the knowledge manager 100, to prioritize questions or requests being submitted to the knowledge manager 100.

The Named Entity subsystem 12 receives and processes each question 11 by using natural language (NL) processing to analyze each question and extract question topic information contained in the question, such as named entities, phrases, urgent terms, and/or other specified terms which are stored in one or more domain entity dictionaries 13. By leveraging a plurality of pluggable domain dictionaries relating to different domains or areas (e.g., travel, healthcare, electronics, game shows, financial services), the domain dictionary 11 enables critical and urgent words (e.g., "threat level") from different domains (e.g., "travel") to be identified in each question based on their presence in the domain dictionary 11. To this end, the Named Entity subsystem 12 may use a Natural Language Processing (NLP) routine to identify the question topic information in each question. As used herein, "NLP" refers to the field of computer science, artificial intelligence, and linguistics concerned with the interactions between computers and human (natural) languages. In this context, NLP is related to the area of human-computer interaction and natural language understanding by computer systems that enable computer systems to derive meaning from human or natural language input. For example, NLP can be used to derive meaning from a human-oriented question such as, "What is tallest mountain in North America?" and to identify specified terms, such as named entities, phrases, or urgent terms contained in the question. The process identifies key terms and attributes in the question and compares the identified terms to the stored terms in the domain dictionary 13.

The Question Priority Manager subsystem 14 performs additional processing on each question to extract question context information 15A. In addition or in the alternative, the Question Priority Manager subsystem 14 may also extract server performance information 15B for the question prioritization system 10 and/or QA system 100. In selected embodiments, the extracted question context information 15A may include data that identifies the user context and location when the question was submitted or received. For example, the extracted question context information 15A may include data that identifies the user who submitted the question (e.g., through login credentials), the device or computer which sent the question, the channel over which the question was submitted, the location of the user or device that sent the question, any special interest location indicator (e.g., hospital, public-safety answering point, etc.), or other context-related data for the question. The Question Priority Manager subsystem 14 may also determine or extract selected server performance data 15B for the processing of each question. In selected embodiments, the server performance information 15B may include operational metric data relating to the available processing resources at the question prioritization system 10 and/or QA system 100, such as operational or run-time data, CPU utilization data, available disk space data, bandwidth utilization data, etc. As part of the extracted information 15A/B, the Question Priority Manager subsystem 14 may identify the SLA or QoS processing requirements that apply to the question being analyzed, the history of analysis and feedback for the question or submitting user, and the like. Using the question topic information and extracted question context and/or server performance information, the Question Priority Manager subsystem 14 is configured to populate feature values for the Priority Assignment Model 16 which provides a machine learning predictive model for generating a target priority values for the question, such as by using an artificial intelligence (AI) rule-based logic to determine and assign a question urgency value to each question for purposes of prioritizing the response processing of each question by the QA system 100.

The Prioritization Manager subsystem 17 performs additional sort or rank processing to organize the received questions based on at least the associated target priority values such that high priority questions are put to the front of a prioritized question queue 18 for output as prioritized questions 19. In the question queue 18 of the Prioritization Manager subsystem 17, the highest priority question is placed at the front for delivery to the assigned QA system 100. In selected embodiments, the prioritized questions 19 from the Prioritization Manager subsystem 17 that have a specified target priority value may be assigned to a specific pipeline (e.g., QA System 100A) in the QA system cluster 100. As will be appreciated, the Prioritization Manager subsystem 17 may use the question queue 18 as a message queue to provide an asynchronous communications protocol for delivering prioritized questions 19 to the QA system 100 such that the Prioritization Manager subsystem 17 and QA system 100 do not need to interact with a question queue 18 at the same time by storing prioritized questions in the question queue 18 until the QA system 100 retrieves them. In this way, a wider asynchronous network supports the passing of prioritized questions as messages between different computer systems 100A, 100B, connecting multiple applications and multiple operating systems. Messages can also be passed from queue to queue in order for a message to reach the ultimate desired recipient. An example of a commercial implementation of such messaging software is IBM's Web Sphere MQ (previously MQ Series). In selected embodiments, the organizational function of the Prioritization Manager subsystem 17 may be configured to convert over-subscribing questions into asynchronous responses, even if they were asked in a synchronized fashion.

The QA system 100 may include one or more QA system pipelines 100A, 100B, each of which includes a computing device 104 (comprising one or more processors and one or more memories, and potentially any other computing device elements generally known in the art including buses, storage devices, communication interfaces, and the like) for processing questions received over the network 140 from one or more users at computing devices (e.g., 110, 120, 130) connected over the network 140 for communication with each other and with other devices or components via one or more wired and/or wireless data communication links, where each communication link may comprise one or more of wires, routers, switches, transmitters, receivers, or the like. In this networked arrangement, the QA system 100 and network 140 may enable question/answer (QA) generation functionality for one or more content users. Other embodiments of QA system 100 may be used with components, systems, sub-systems, and/or devices other than those that are depicted herein.

In each QA system pipeline 100A, 100B, a prioritized question 19 is received and prioritized for processing to generate an answer 20. In sequence, prioritized questions 19 are dequeued from the shared question queue 18, from which they are de-queued by the pipeline instances for processing in priority order rather than insertion order. In selected embodiments, the question queue 18 may be implemented based on a "priority heap" data structure. During processing within a QA system pipeline (e.g., 100A), questions may be split into many subtasks which run concurrently. A single pipeline instance can process a number of questions concurrently, but only a certain number of subtasks. In addition, each QA system pipeline may include a prioritized queue (not shown) to manage the processing order of these subtasks, with the top-level priority corresponding to the time that the corresponding question started (earliest has highest priority). However, it will be appreciated that such internal prioritization within each QA system pipeline may be augmented by the external target priority values generated for each question by the Question Priority Manager subsystem 14 to take precedence or ranking priority over the question start time. In this way, more important or higher priority questions can "fast track" through the QA system pipeline if it is busy with already-running questions.

In the QA system 100, the knowledge manager 104 may be configured to receive inputs from various sources. For example, knowledge manager 104 may receive input from the question prioritization system 10, network 140, a knowledge base or corpus of electronic documents 106 or other data, a content creator 108, content users, and other possible sources of input. In selected embodiments, some or all of the inputs to knowledge manager 104 may be routed through the network 140 and/or the question prioritization system 10. The various computing devices (e.g., 110, 120, 130, 150, 160, 170) on the network 140 may include access points for content creators and content users. Some of the computing devices may include devices for a database storing the corpus of data as the body of information used by the knowledge manager 104 to generate answers to cases. The network 140 may include local network connections and remote connections in various embodiments, such that knowledge manager 104 may operate in environments of any size, including local and global, e.g., the Internet. Additionally, knowledge manager 104 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 104. The document 106 may include any file, text, article, or source of data (e.g., scholarly articles, dictionary definitions, encyclopedia references, and the like) for use in knowledge manager 104. Content users may access knowledge manager 104 via a network connection or an Internet connection to the network 140, and may input questions to knowledge manager 104 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 104 may interpret the question and provide a response to the content user containing one or more answers to the question. In some embodiments, knowledge manager 104 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input prioritized question 19 and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. The QA system 100 then generates an output response or answer 20 with the final answer and associated confidence and supporting evidence. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information processing systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information processing systems include pen, or tablet, computer 120, laptop, or notebook, computer 130, personal computer system 150, and server 160. As shown, the various information processing systems can be networked together using computer network 140. Types of computer network 140 that can be used to interconnect the various information processing systems include Local Area Networks (LANs), Wireless Local Area Networks (WLANs), the Internet, the Public Switched Telephone Network (PSTN), other wireless networks, and any other network topology that can be used to interconnect the information processing systems. Many of the information processing systems include nonvolatile data stores, such as hard drives and/or nonvolatile memory. Some of the information processing systems may use separate nonvolatile data stores (e.g., server 160 utilizes nonvolatile data store 165, and mainframe computer 170 utilizes nonvolatile data store 175). The nonvolatile data store can be a component that is external to the various information processing systems or can be internal to one of the information processing systems. An illustrative example of an information processing system showing an exemplary processor and various components commonly accessed by the processor is shown in FIG. 2.

Figure 2:
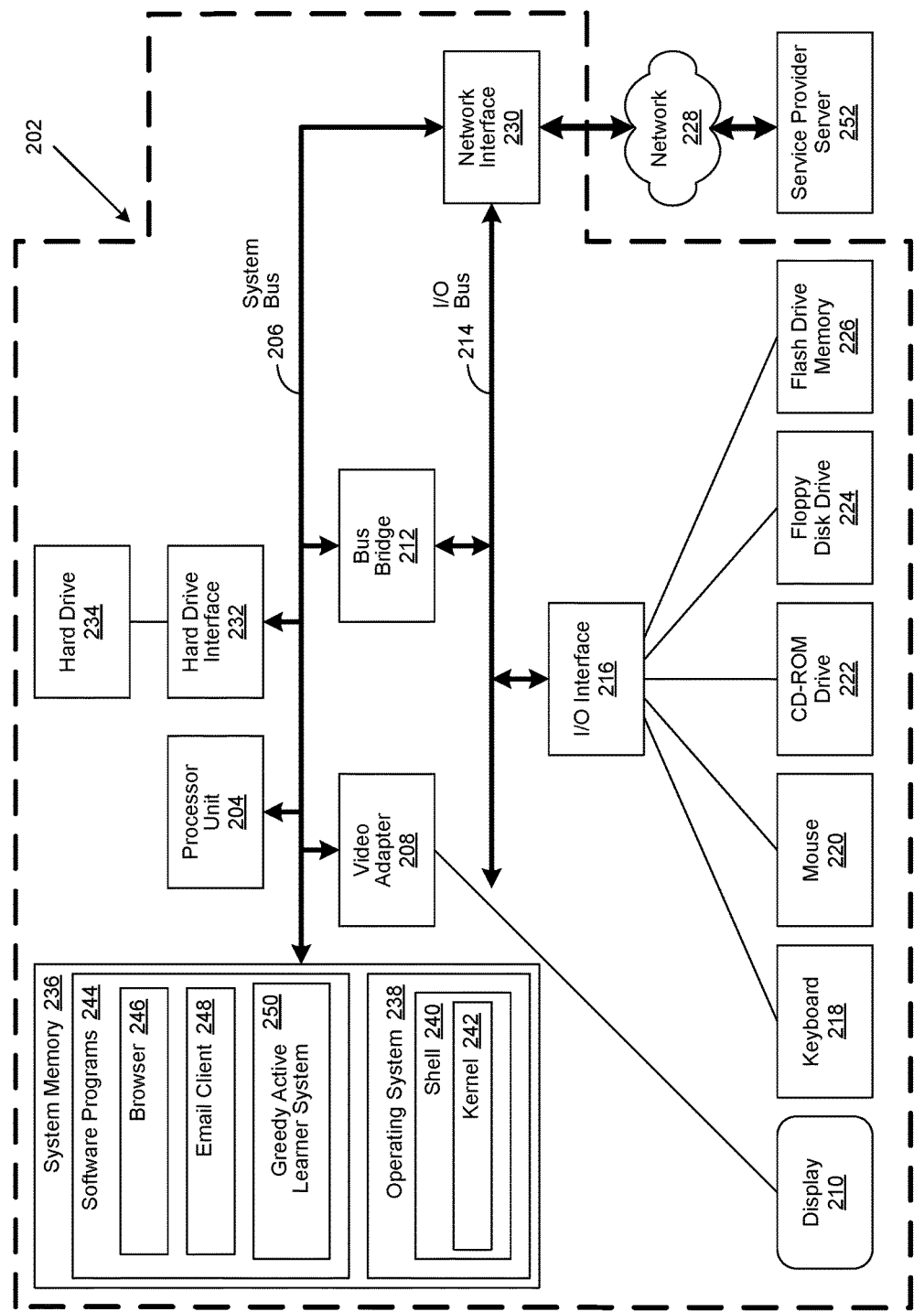
FIG. 2 is a simplified block diagram of an information handling system capable of performing computing operations.

FIG. 2 illustrates an information processing system 202, more particularly, a processor and common components, which is a simplified example of a computer system capable of performing the computing operations described herein. Information processing system 202 includes a processor unit 204 that is coupled to a system bus 206. A video adapter 208, which controls a display 210, is also coupled to system bus 206. System bus 206 is coupled via a bus bridge 212 to an Input/Output (I/O) bus 214. An I/O interface 216 is coupled to I/O bus 214. The I/O interface 216 affords communication with various I/O devices, including a keyboard 218, a mouse 220, a Compact Disk-Read Only Memory (CD-ROM) drive 222, a floppy disk drive 224, and a flash drive memory 226. The format of the ports connected to I/O interface 216 may be any known to those skilled in the art of computer architecture, including but not limited to Universal Serial Bus (USB) ports.

The information processing system 202 is able to communicate with a service provider server 252 via a network 228 using a network interface 230, which is coupled to system bus 206. Network 228 may be an external network such as the Internet, or an internal network such as an Ethernet Network or a Virtual Private Network (VPN). Using network 228, client computer 202 is able to use the present invention to access service provider server 252.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes the information processing system's 202 operating system (OS) 238 and software programs 244.

OS 238 includes a shell 240 for providing transparent user access to resources such as software programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. While shell 240 generally is a text-based, line-oriented user interface, the present invention can also support other user interface modes, such as graphical, voice, gestural, etc.

As depicted, OS 238 also includes kernel 242, which includes lower levels of functionality for OS 238, including essential services required by other parts of OS 238 and software programs 244, including memory management, process and task management, disk management, and mouse and keyboard management. Software programs 244 may include a browser 246 and email client 248. Browser 246 includes program modules and instructions enabling a World Wide Web (WWW) client (i.e., information processing system 202) to send and receive network messages to the Internet using HyperText Transfer Protocol (HTTP) messaging, thus enabling communication with service provider server 252. In various embodiments, software programs 244 may also include a greedy active learning system 250. In these and other embodiments, the greedy active learning system 250 includes code for implementing the processes described here in below. In one embodiment, information processing system 202 is able to download the greedy active learning system 250 from a service provider server 252.

The hardware elements depicted in the information processing system 202 are not intended to be exhaustive, but rather are representative to highlight components used by the present invention. For instance, the information processing system 202 may include alternate memory storage devices such as magnetic cassettes, Digital Versatile Disks (DVDs), Bernoulli cartridges, and the like. These and other variations are intended to be within the spirit, scope and intent of the present invention.

Figure 3:
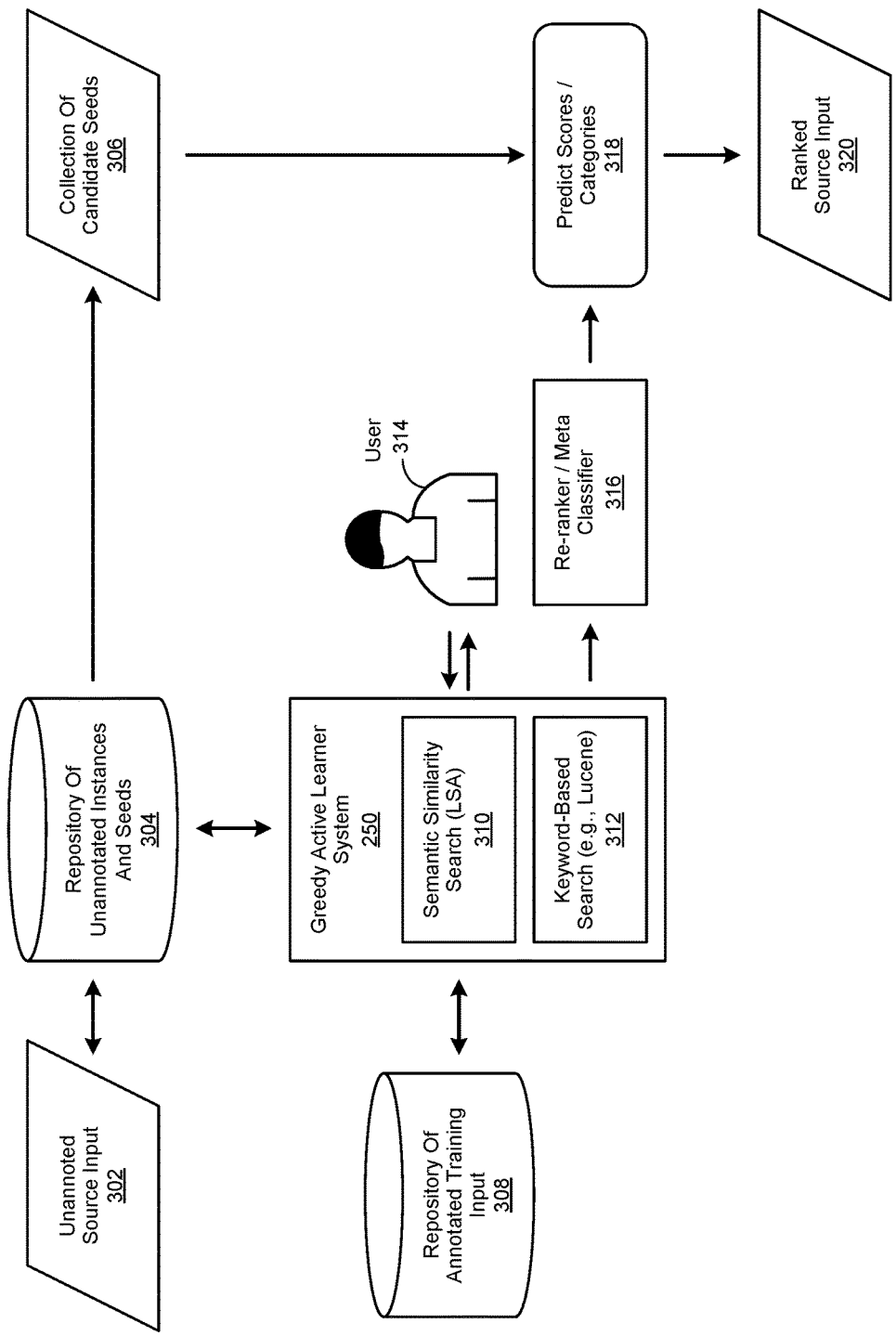
FIG. 3 is a simplified block diagram of a greedy active learner (GAL) system.

FIG. 3 is a simplified block diagram of a greedy active learner (GAL) system implemented in accordance with an embodiment of the invention to reduce interaction with a user in the performance of a Natural Language Processing (NLP) task, such as text categorization. Skilled practitioners of the art will be aware that the use of machine learning, a sub-field of artificial intelligence (AI) that provides computers with the ability to learn without being explicitly programmed to do so, has become more prevalent in recent years. In general, there are three common approaches to machine learning: supervised, unsupervised and semi-supervised. In supervised machine learning approaches, the computer is provided example inputs consisting of manually-labeled training data, and their desired outputs, with the goal of generating general rules and features that can subsequently be used to associate a given input with a corresponding output.

In these approaches, an example of each contiguous sequence of n items, or n-gram, is typically identified within a source corpus of human-readable text. The resulting n-gram examples are then processed to identify their associated descriptive features (e.g., phonemes, syllables, letters, words, base pairs, etc.), which are in turn used to assign a positive or negative label to each n-gram example. The resulting labels can then be used by a classifier to discriminate between positive and negative examples as a function of their respective features.

As used herein, a positive label broadly refers to an annotation that indicates a given n-gram example meets one or more criteria. Likewise, a negative label broadly refers to an annotation that indicates a given n-gram example fails to meet one or more criteria. As an example, the word "dog" would be annotated with a positive label as an example of a mammal, while the word "turtle" would be annotated with a negative label. As likewise used herein, a classifier broadly refers to an algorithm used to perform classification operations to determine which category (i.e., sub-populations) to associate individual instances within a corpus of content. In contrast, unsupervised learning approaches do not use training data to learn explicit features. Instead, these approaches infer functions to discover non-obvious or hidden structures within unlabeled data.

Those of skill in the art will likewise be aware that while unlabeled data is abundant, manually labeling it for supervised machine learning can be time consuming, tedious, and expensive. Active learning, a form of semi-supervised machine learning, addresses this issue through the implementation of a learning algorithm that interactively queries a user, or other information source, to obtain labels for unannotated input data. As used herein, semi-supervised machine learning broadly refers to a subset of supervised learning approaches that also make use of unlabeled data for training. In these approaches, a small amount of labeled data is typically used with a larger amount of unlabeled data.

As such, semi-supervised learning falls between supervised learning, which only uses labeled training data, and unsupervised learning, which uses no labeled training data. Those of skill in the art will be aware that unlabeled data, when used in conjunction with a relatively small amount of labeled data, can often result in an improvement in learning accuracy. However, the acquisition of labeled data for learning typically requires interaction with a knowledgeable human annotator. Accordingly, while acquisition of unlabeled data may be relatively inexpensive, the cost of associated manual labeling processes may render a fully-labeled set of training infeasible. In view of the foregoing, skilled practitioners of the art will recognize that semi-supervised learning approaches may result in the realization of practical value.

In various active learning approaches, the learner typically chooses the examples to be labeled. As a result, the number of examples needed to learn a concept may be lower than the number of examples needed for typical supervised learning approaches. For example, an active learner may attempt to select the most informative example from an unlabeled pool of example instances. In this example, the learner typically begins with a small number of instances, known as seeds, in the labeled training set L. It then requests labels for one or more carefully selected instances, learns from the corresponding query results, and then utilizes its new knowledge to choose which instances to query next. The resulting, newly-labeled instances are added to the labeled training set L until some stopping criteria is met, at which time the learner proceeds in a typical supervised learning manner.

Skilled practitioners of the art will likewise be aware that one commonly used querying framework for implementing an active learner is uncertainty sampling, introduced by Lewis and Gale in 1994. In this framework, an active learner queries the instances about which it is least certain how to label. That is, it chooses label points that are near the decision boundary of a particular hypothesis. Likewise, those of skill in the art will be aware that a core aspect of an active learner is a machine-learning-based, supervised classifier that is trained using the instances that have been previously annotated, or labeled, and applying them to the remaining unannotated instances.

One known and popular choice for a machine language (ML) classifier is the Support Vector Machine (SVM) introduced by Tong and Chang in 2001, with additional approaches described by Tong and Koller in 2002. Skilled practitioners of the art will be familiar with SVMs, also known as support vector networks, which are supervised learning models that incorporate associated learning algorithms implemented to analyze data used for classification and regression analysis. As typically implemented, an SVM is provided a set of training examples, each of which is annotated as belonging to one of two categories. An associated training algorithm then builds a model that assigns new examples to either one category or the other. As such, an SVM performs as a non-probabilistic, binary, linear classifier that can be used to build a model representing examples as points in space, mapped such that examples of the two categories are separated by as wide a gap, or margin, as possible. New examples are then mapped into the same model space, and according to which side of the gap they fall, a prediction is made as to which category they are associated.

However, other ML classifiers are known, such as Neural Network, introduced by Cohn et al. in 1996, and Logistic Regression, introduced by Nguyen and Smeulders in 2004. Also known is so-called cluster-adaptive active learning, proposed by Dasgupta and Hsu in 2008, where a hierarchical cluster is imposed on the entire target dataset in the process of querying an oracle (i.e., a user or other information source) for annotation of particular seeds. One aspect of this approach is to exploit Latent Dirichlet Allocation (LDA), a distributional semantics technique, during clustering.

Regardless of the approach(es) selected for implementation, there is a risk that the learner may be overwhelmed by an imbalanced distribution of positive and negative examples in the unlabeled training set. For example, only a few of those examples may warrant a positive label. As a result, there is a good possibility the annotator will label a given example as negative whenever the learner chooses the most informative instance. Consequently, there is a possibility that the learner may generate an unbalanced preponderance of negative labels, which is not only time consuming for the annotator, but may result in less than optimal machine learning performance and effectiveness as well.

This issue is addressed in various embodiments by implementing a greedy active learner (GAL) system to select an instance it is most certain of being a positive instance (i.e., the least informative positive instance), rather than an instance it is least certain of being positive, from a collection of unannotated instances. As an example, a significant number of unlabeled instances may be available for use in the performance of a natural language processing (NLP) task, such as text categorization. However, it is possible that only a small number of those instances will result in being annotated with a positive label. Consequently, there is a statistically-high probability that a given instance selected by a typical learner known to those of skill in the art will be labeled as negative by a human annotator.

To continue the example, it is possible for the annotator to have annotated a large number of instances (e.g., 50 or more), without having found a single instance to be labeled as positive. Consequently, the annotation process can be time consuming and ineffective, as well as generating an unbalanced preponderance of negative labels. However, selection of instances deemed most likely to be positive by the GAL system would increase the likelihood of the selected instance being labeled as positive by the human annotator. Accordingly, the annotation process would require less time, and likewise be more effective, as the resulting higher percentage of positive, labeled instances would likely result in more optimal machine learning performance.

Those of skill in the art will be aware that data imbalance is often an impediment to machine learning (ML) algorithms obtaining optimum results. In particular, research known to skilled practitioners of the art has shown that unbalanced datasets lead to poor performance for the minority class. For example, an ML algorithm trained with a lower number of annotations for positive instances in the annotated data is likely to have poor performance in identifying positive instances in previously unseen test instances. While differences between positive and negative counts in annotated data may be offset by optimizing certain hyper-parameters of an ML algorithm, those of skill in the art will likewise recognize that reduction of such data imbalances would likely be a more effective approach. Accordingly, the GAL system is implemented in certain embodiments to maintain a balance in the distribution of likely-positive and likely-negative instances presented to a human annotator for labeling. In these embodiments, the ratio of likely-positive to likely-negative instances is a matter of design choice.

Skilled practitioners of the art will also be aware it is helpful for active learners to start with some number of initial seeds. As used herein, a seed broadly refers to a labeled instance of data used for training an active learner. However, situations may occur where no initial seed is available and the active learner has to begin without any labeled data whatsoever. This issue is addressed in various embodiments by implementing the GAL system such that no initial seed is required for its operation.

In these embodiments, as described in greater detail herein, a combination of distributional semantics and a search engine are implemented to perform a semantic search of a pool of unlabeled example instances to select candidate seeds. As used herein, distributional semantics broadly refers to approaches for quantifying and categorizing semantic similarities between linguistic items based upon their distributional properties in large samples of language data. As such, distributional semantics postulates that linguistic items with similar distributions have similar meanings.

As likewise used herein, a semantic search broadly refers to approaches for improving search accuracy by understanding the searcher's intent and the contextual meaning of terms as they appear within a given searchable dataspace to generate more relevant results. In various embodiments, a semantic search may be performed on the World Wide Web or within a closed system, such as datastores owned and managed by an enterprise or other organization.

Those of skill in the art will be aware that semantic search systems typically consider a range of criteria, including the context of a search, location, intent, variation of words, synonyms, and concept matching, as well as natural language, generalized and specialized queries, to provide relevant search results. Examples of web search engines incorporating various elements of semantic search include Google™ and Bing™, provided by Microsoft Corporation of Redmond, Wash.

In various embodiments, Latent Semantic Analysis (LSA), also known as Latent Semantic Indexing (LSI), approaches familiar to skilled practitioners of the art are implemented to perform distributional semantics operations. As used herein, LSA broadly refers to approaches for analyzing relationships between a corpus of human-readable text, and the terms it contains, by producing an associated set of related concepts. In such approaches, LSA assumes that words that are close in meaning will occur in similar pieces of text.

In certain embodiments, an LSA matrix containing word counts per paragraph, where rows represent unique words and columns represent each paragraph, is constructed from a large body of text. A mathematical operation known as singular value decomposition (SVD) is then performed to reduce the number of columns while preserving the similarity structure amongst the rows. Words are then compared by taking the cosine of the angle between the two vectors, or the dot product between the normalizations of the two vectors, formed by any two rows. Values close to '1' represent very similar words while values close to '0' represent very dissimilar words.

As likewise used herein, a search engine broadly refers to an information retrieval system implemented to find information stored on a computer system. In various embodiments, the search engine is a web search engine implemented to search for information on the World Wide Web. In certain embodiments, the search engine is an enterprise search engine implemented to search for proprietary and nonproprietary information stored in various locations associated with an organization. In various embodiments, the search engine is based upon Lucene, an open-source search technology supported by the Apache Software Foundation.

Referring now to FIG. 3, unannotated source input 302 is received and stored in a repository of unannotated instances and seeds 304. In various embodiments, the unannotated source input 302 may include a corpus of content. In certain embodiments, the unannotated source input 302 may include a stream of data, such as a newsfeed, that is received and then stored in the repository of unannotated instances and seeds 304 as it is produced or made available for consumption. In these embodiments, the unannotated source input 302 may include human readable text, metadata associated with a text, a graphics file, an audio file, a video file, or some combination thereof.

In one embodiment, the unannotated source input 302 is filtered according to subject, source, date, time, or some combination thereof, prior to being stored in the repository of unannotated instances and seeds 304. In this embodiment, the method by which the unannotated source input 302 is filtered is a design choice. In another embodiment, the unannotated source input 302 is provided as a service prior to being stored in the repository of unannotated instances and seeds 304. In yet another embodiment, the repository of unannotated instances and seeds 304 may be centralized in a single datastore. In yet still another embodiment, the repository of unannotated instances and seeds 304 may be distributed across multiple datastores. Those of skill in the art will recognize that many such embodiments are possible and the foregoing is not intended to limit the spirit, scope, or intent of the invention.

In various embodiments, a user 314 provides an input category and associated query terms for text categorization to the GAL system 250. As used herein, an input category broadly refers to an information domain. In certain embodiments, the input category may be broad (e.g., "aviation"), or narrow (e.g., "jet-propelled commercial airliners"). As likewise used herein, a query term broadly refers to a criteria used in association with the input category to more narrowly define the input category. For example, the query terms "wide body," "jet-propelled," and "commercial" would more narrowly define the input category of "aircraft." Likewise, the query terms "maintenance" and "issues" combined with the trigger terms "wide body," "jet-propelled," and "commercial" would define the input category "aircraft" even further.

In certain embodiments, the query terms are used to link an input category to various aspects of another input category. As an example, the query terms "unionized" and "mechanic" may relate to the input category of "workers." In this example, combination of the trigger terms "unionized," "mechanic," "maintenance," "issues," "wide body," "jet-propelled," and "commercial" would more narrowly define the input category "aircraft," through association with the input category of "workers."

In response to receiving the input category and any associated query terms, the GAL 250 selects a particular unannotated instance as a candidate seed from the repository of unannotated instances and seeds 304 as described in greater detail herein. The unannotated candidate seed is then provided to the user 314 for annotation. In various embodiments, the user 314 may be a human annotator, an information resource, or an oracle. As used herein, an oracle broadly refers to a domain expert who possesses relevant data, or knowledge, related to a given information domain. It will be appreciated that the decision to annotate a given instance with a positive or a negative label is oftentimes contingent upon nuances and subtleties of understanding and knowledge that only such an oracle may possess. In view of the foregoing, the terms "user" 314, "human annotator," "information resource," and "oracle" are used interchangeably herein for simplicity.

In various embodiments, the GAL system 250 is implemented to perform a semantic similarity search 310 of the repository of unannotated instances and seeds 304 to select candidate seeds 306 for annotation. In certain embodiments, LSA approaches familiar to skilled practitioners of the art are implemented to perform the semantic similarity search 310. In these embodiments, the input category and any associated query terms provided by the user 314 are used in the semantic similarity search 310 to identify semantically-similar instances in the repository of unannotated instances and seeds 304.

In various embodiments, the GAL system 250 is implemented to perform a keyword-based search 312 of the repository of unannotated instances and seeds 304 to select candidate seeds 306 for annotation. In certain embodiments, the keyword-based search 312 is performed with a search engine (e.g., Lucene-based) familiar to those of skill in the art. In these embodiments, the input category and any associated query terms provided by the user 314 are used in the keyword-based search 312 to identify similar instances in the repository of unannotated instances and seeds 304. In one embodiment, the similar instances are identified through the use of term frequency-inverse document frequency (tf-idf) scores, which are generated by the search engine. As used herein, tf-idf scores broadly refer to numerical statistics that reflect the importance of a word in a corpus. As such, it is often used as a weighting factor in information retrieval and text mining. Accordingly, tf-idf scores are useful in finding similar instances in the use of a particular word or phrase.

In various embodiments, an ML-based supervised classifier ("classifier") is implemented, as described in greater detail herein, to select the unannotated candidate seed 306. In one embodiment, the ML-based classifier uses support vector machine (SVM) approaches and an associated ML algorithm. In another embodiment, the ML-based classifier uses another non-SVM ML algorithm. The resulting tokens, excluding stop words, and the LSA vectors of the instances are then used as features by the classifier. In various embodiments, labeled seeds stored in the repository of annotated training input are used to train the ML algorithm to select the unannotated candidate seed 306.

In various embodiments, the GAL system 250 is implemented with a semantic search-based seed selector (SSSS)

to select the candidate unannotated seed 306. In these embodiments, the SSSS takes into consideration two different scores: an LSA similarity score and a search engine score, which are used in combination to rank unannotated instances stored in the repository of unannotated instances and seeds 304. In certain embodiments, the LSA similarity score and the keyword based search score are only used when either no training set exists for the ML classifier or the ratio between positive and negative examples in the training set is beyond a desired threshold. In one embodiment, an LSA model familiar to those of skill in the art is used to generate the LSA similarity score. In certain embodiments, the LSA similarity score is a score indicating the degree of similarity between a given unannotated instance, the current input category provided by the user 314, and any previously-annotated seeds within the repository of annotated training input 308.

In another embodiment, the search engine score is generated by a search engine, such as a Lucene-based search engine. In this embodiment, the search engine score is generated by creating an in-memory search index, in near-real-time, from the remaining unannotated instances, and concurrently, by using the current input category provided by the user 314 to search the remaining unannotated instances. The resulting LSA similarity scores, search engine scores, the input category, and any associated query terms are then processed in block 316 to rank the unannotated instances and seeds stored in the repository of unannotated instances and seeds 304.

In various embodiments, the LSA similarity scores, the search engine scores, the input category, and any associated query terms are processed by a semantic search-based seed selector (SSSS) implemented to perform ranking operations 316. In certain embodiments, a "bag of words" (BOW) model is implemented in combination with the semantic similarity search 310 and the keyword search 312 to perform re-ranking operations 316 to predict confidence 318 of the resulting LSA similarity search engine scores. As used herein, a BOW model broadly refers to a simplifying representation commonly used in natural language processing (NLP) and information retrieval. In the BOW, a text (e.g. a sentence or a document) is represented as a "bag," or multiset, of its words, disregarding grammar and word order, but maintaining multiplicity Once the unannotated instances are ranked, the GAL system 250 uses their respective ranking to select the next candidate seed. For example, an unannotated instance with the highest ranking may indicate it is most likely to be annotated with a positive label by the user 314. Conversely, an unannotated instance with the lowest ranking may indicate it is most likely to be annotated with a negative label, either automatically by the GAL system 250, or manually by the user 314.

Once selected, the unannotated candidate seed is provided to the user 314 for annotation, or alternatively, it is automatically annotated with a negative label if the GAL system 250 is sufficiently confident that the selected seed is a negative instance that does not represent the input category selected by the user 314. Once annotated, the labeled seed is then stored in the repository of annotated training input 308.

In various embodiments, a determination is made to provide relevant, ranked source input 320 to the user 302. In these embodiments, LSA scores, search engine scores, the input category and associated query terms, and seed annotation metadata (i.e., positive and negative labels) are used to rank relevant source input 302. The resulting ranked source input 320 is then provided to the user 314. For example, annotated seeds may be provided in their ranked order first, followed by unannotated instances provided in their ranked order.

Figure 4:
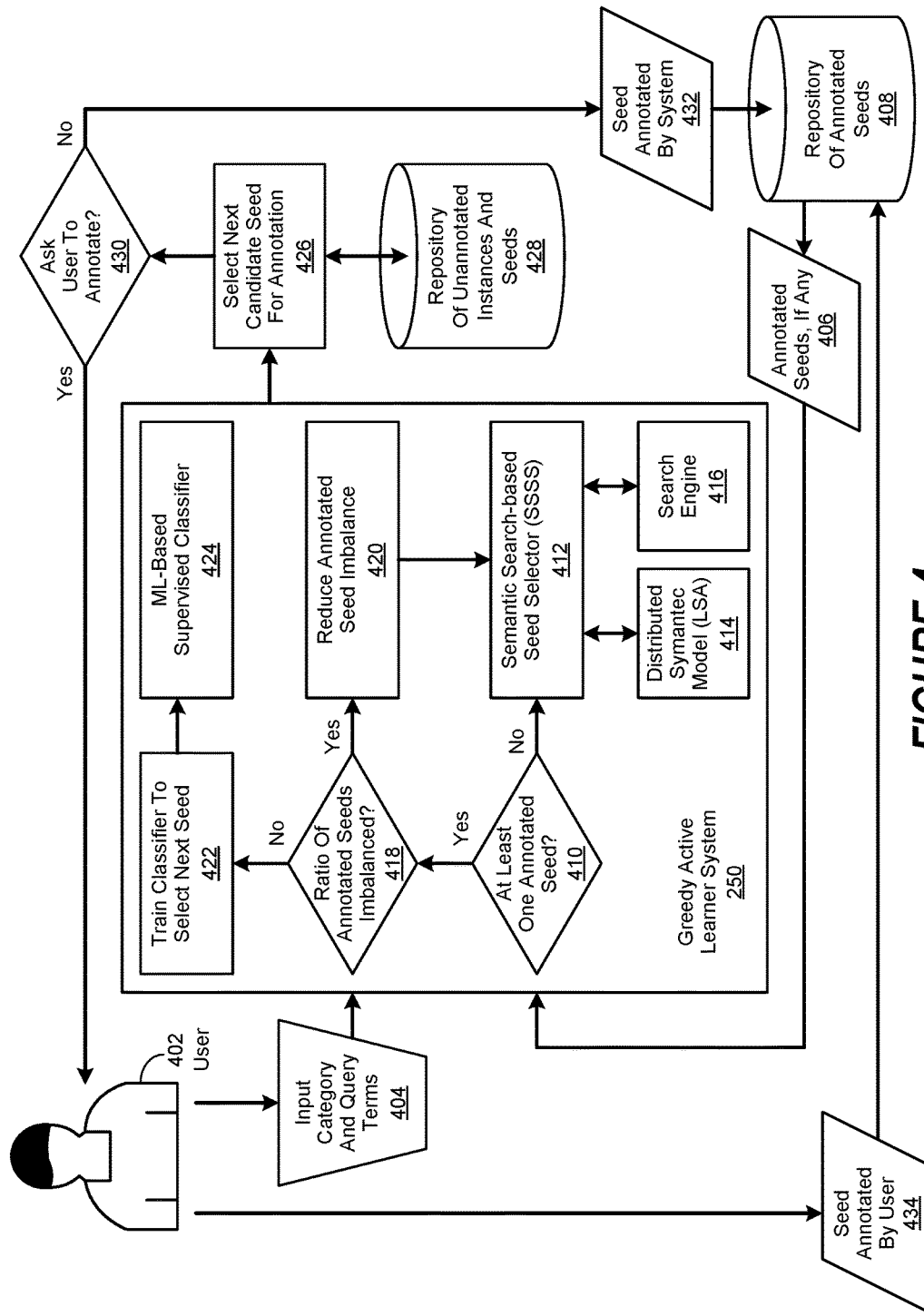
FIG. 4 is a generalized process flow diagram of the operation of a GAL system.
Figure 5A:
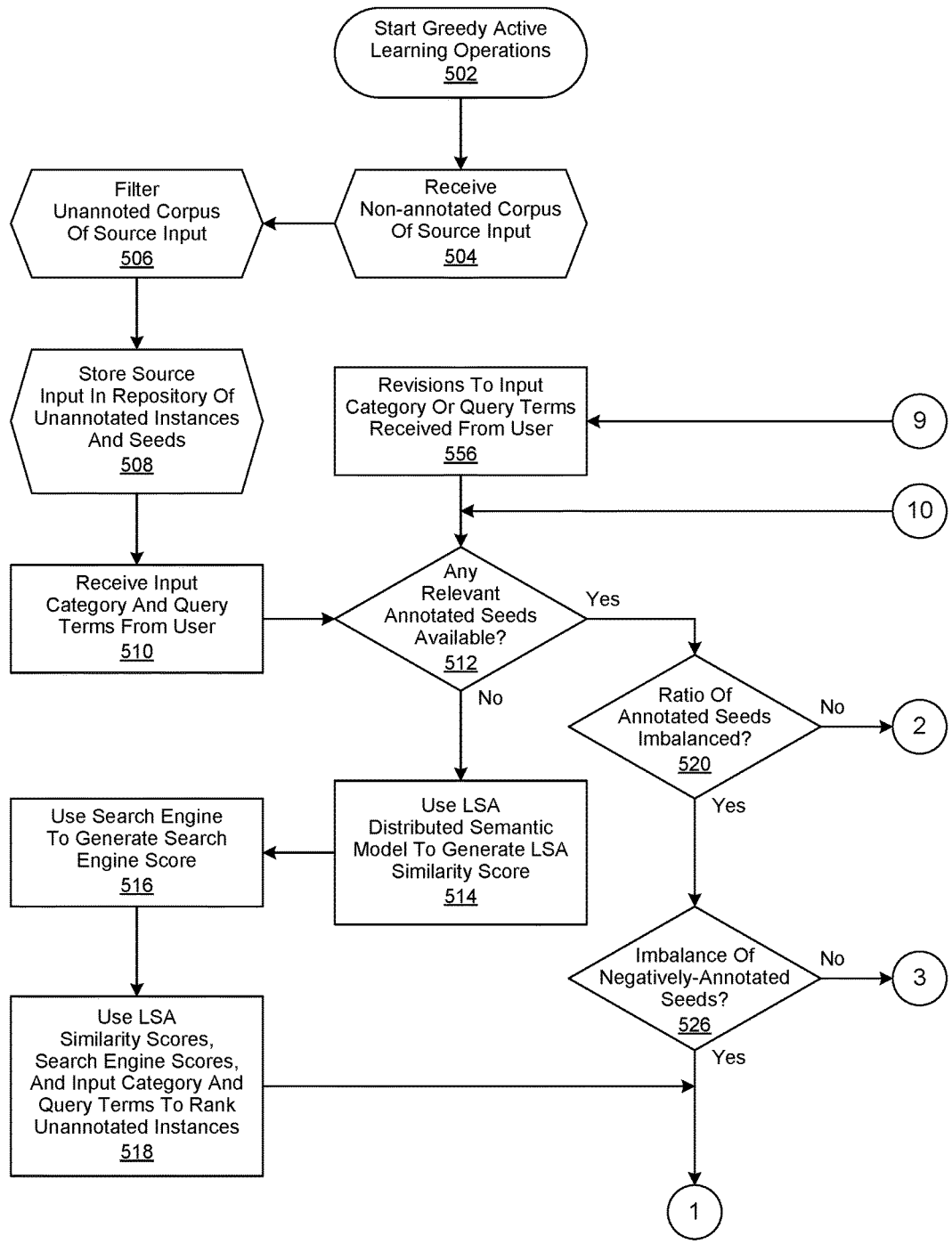
FIGS. 5a-5d (referred to herein as FIG. 5) are a generalized flowchart of the operation of a GAL system.
Figure 5B:
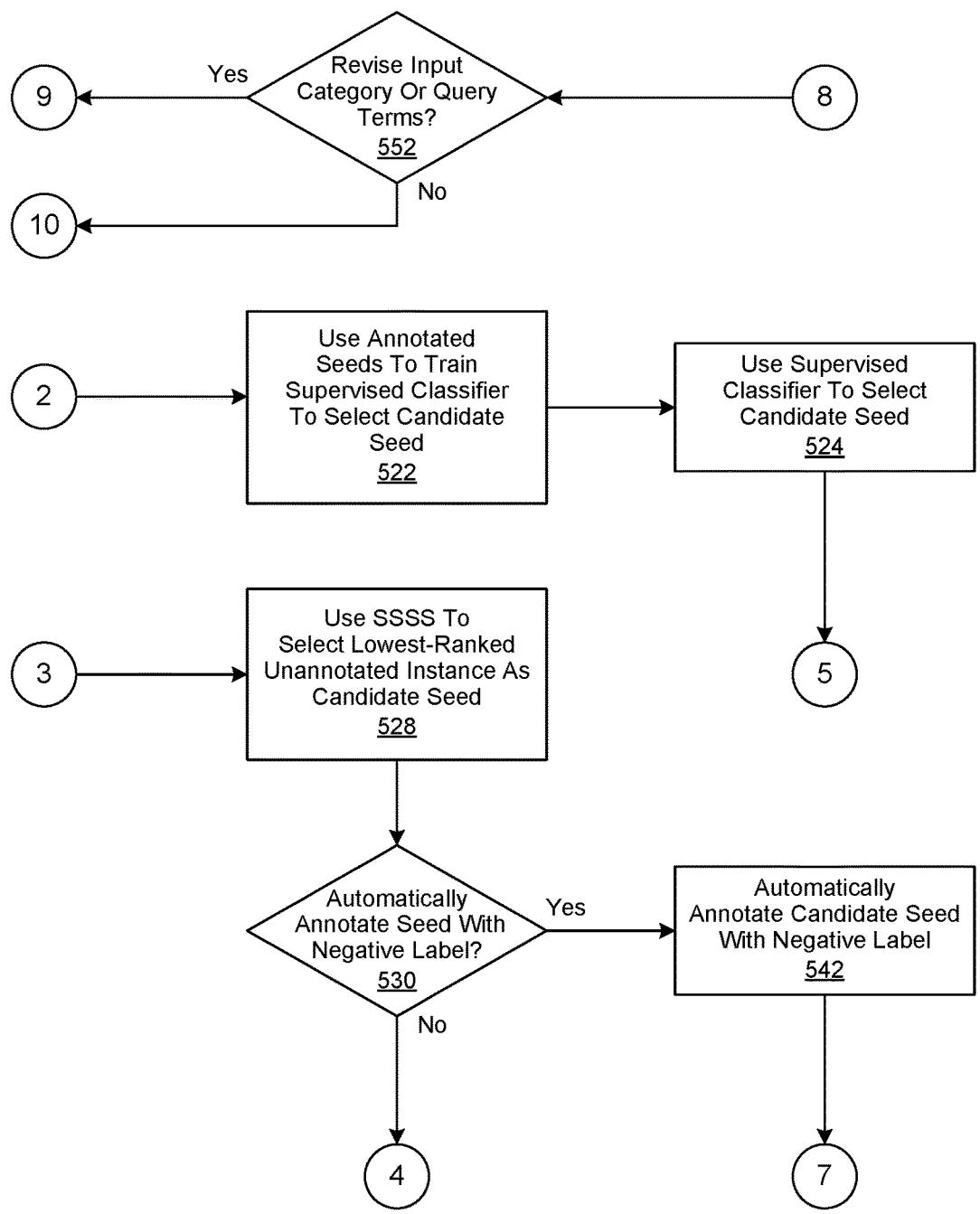
Figure 5C:
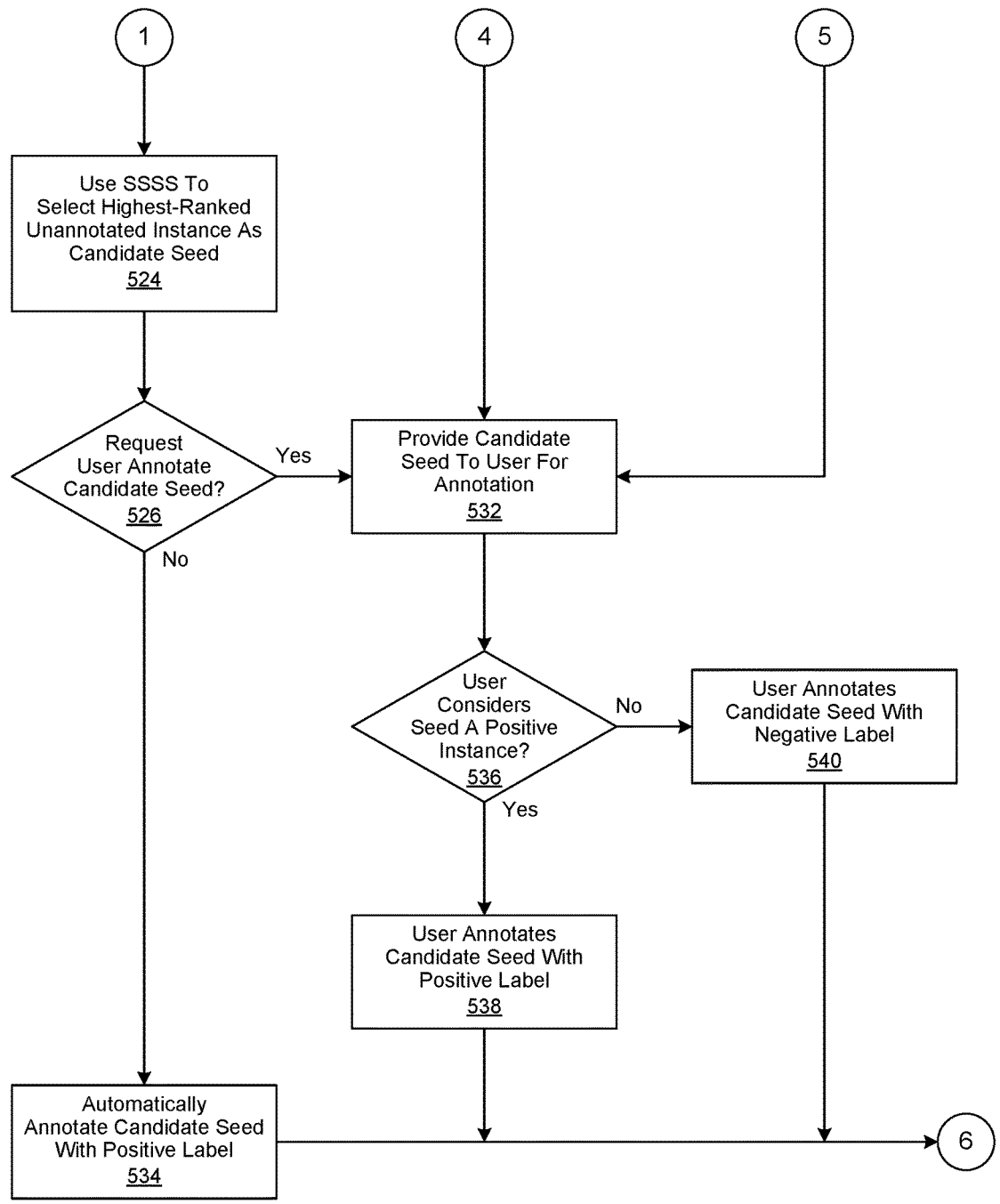
Figure 5D:
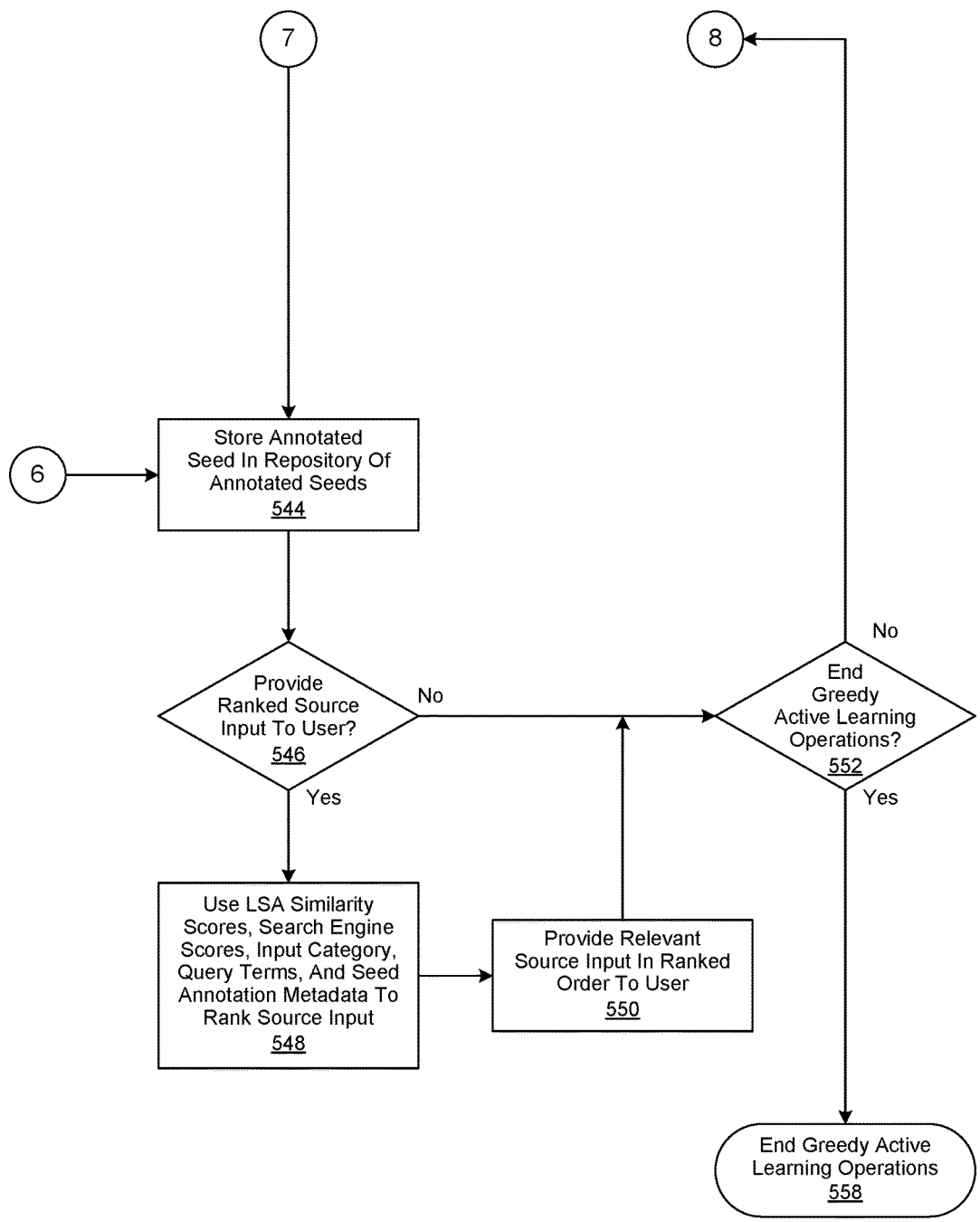

FIG. 4 is a generalized process flow diagram of the operation of a greedy active learner (GAL) system implemented in accordance with an embodiment of the invention to reduce user interaction when performing a Natural Language Processing (NLP) task, such as text categorization. In this embodiment, a user 402, described in greater detail herein, provides an input category and associated query terms 404 for text categorization to the GAL system 250, which in response selects a candidate unannotated seed in block 426 from the repository of unannotated instances and seeds 428.

In various embodiments, a semantic search-based seed selector (SSSS) 412 is implemented to select the candidate unannotated seed. In these embodiments, the SSSS 412 takes into consideration two different scores, a Latent Semantic Analysis (LSA) similarity score and a search engine score, which are used in combination to rank unannotated instances stored in the repository of unannotated instances and seeds 428. Once ranked, the SSSS uses the ranking in block 426 to select the next candidate seed. For example, the unannotated seed with the highest ranking may indicate it is most likely to be annotated with a positive label by the user 402. Conversely, the unannotated seed with the lowest ranking may indicate it is most likely to be annotated with a negative label, either automatically by the GAL system 250 or manually by the user 402.

In one embodiment, an LSA distributed semantic model 414 is used to generate the LSA similarity score. In certain embodiments, the LSA similarity score is a score indicating the degree of similarity between a given unannotated instance, the current input category and associated query terms 404 provided by the user 402, and any previously-annotated seeds 406 stored within the repository of annotated seeds 408. In one embodiment, the search engine score is generated by a search engine 416, such as a Lucene-based search engine. In this embodiment, the search engine score is generated by creating an in-memory search index, in near-real-time, from the remaining unannotated instances, and concurrently, by also using the current input category and associated query terms 404 provided by the user 402.

In various embodiments, a machine learning (ML)-based supervised classifier ("classifier") 424 is implemented to select the unannotated seed. In one embodiment, the ML-based classifier 424 uses support vector machine (SVM) approaches and an associated ML algorithm. In another embodiment, the ML-based classifier 424 uses a non-SVM ML algorithm. In this embodiment, the selection of the non-SVM ML algorithm is a matter of design choice. The resulting tokens, excluding stop words, and the LSA vectors of the instances are then used as features by the classifier 424.

In certain embodiments, a determination is made in block 410 whether any annotated seeds 406, regardless of whether they are annotated with a positive or a negative label, are present in the repository of annotated seeds 408. If not, then the SSSS 412 is used in block 426, as described in greater detail herein, to select the next candidate unannotated seed. In one embodiment, the SSSS 412 selects the highest-ranked candidate unannotated seed. In this embodiment, the highest-ranked candidate unannotated seed is the unlabeled instance the SSSS 412 believes most likely to be annotated with a positive label by the user 402. I.e., an unlabeled instance having a highest confidence level of being a positive instance.

Otherwise, a determination is made in block 418 whether the ratio of positively-labeled seeds to negatively-labeled seeds in the repository of annotated seeds 408 is imbalanced beyond a particular threshold. For example:

# of positive seeds/# of negative seeds>threshold (th)

# of negative seeds/# of positive seeds>threshold (th)

In various embodiments, the particular level of acceptable or unacceptable imbalance between positively-labeled seeds to negatively-labeled seeds, or the value of th, is a matter of design choice. If it is determined in block 418 that the ratio of positively-labeled seeds to negatively-labeled seeds is imbalanced beyond the selected th value, then a decision is made in block 420 to reduce the annotated seed imbalance and the SSSS 412 is used to select the next candidate seed for annotation in block 426.

As an example, if there is a preponderance of negatively-labeled seeds in the repository of annotated seeds 408, the SSSS 412 may select a candidate unannotated seed in block 426 that it believes has the highest certainty of being positive. I.e., an unlabeled instance having a highest confidence level of being a positive instance for an input category. In this example, the candidate seed selected by the SSSS 412 would have a high ranking. Conversely, if there is a preponderance of positively-labeled seeds in the repository of annotated seeds 408, the SSSS 412 may select a candidate unannotated seed in block 426 that it believes has the highest certainty of being negative. I.e., an unlabeled instance having a highest confidence level of being a negative instance for an input category. To continue the example, the candidate seed selected by the SSSS 412 would have the lowest ranking, indicating that the SSSS 412 believes there is a high certainty it would be assigned a negative label if it were annotated by a human annotator 402.

From the foregoing, those of skill in the art will recognize that the selection of a candidate seed the SSSS 412 believes would be annotated with a positive label by the user 402 would likely reduce an imbalanced preponderance of negatively-labeled seeds the repository of annotated seeds 408. Likewise, the selection of a candidate seed the SSSS 412 believes would likely be annotated with a negative label by the user 402 would likely reduce an imbalanced preponderance of positively-labeled seeds the repository of annotated seeds 408.

However, if it is determined in block 418 that the ratio of annotated seeds is not imbalanced beyond a particular level, then annotated seeds 406 are used to train the classifier 424 in block 422. The trained classifier 424 then predicts confidence scores for the unannotated seeds remaining in the repository of unannotated instances and seeds 428 that it believes would likely be annotated with a positive label by the user 402. In turn, the resulting confidence scores would be used by the classifier 424 in block 426 to select the next candidate seed for annotation in block 426.

Once the unannotated seed is selected in block 426, a determination is made in block 430 whether to provide the unannotated seed to the user 402 for annotation. In various embodiments, the candidate seed may be provided to the user 402 for annotation, where it is annotated accordingly in block 434 and then added to the repository of annotated seeds 408. In certain embodiments, if the SSSS 412 is sufficiently confident that the candidate seed would be respectively annotated with either a positive or negative label by the user 402, then it is annotated accordingly by the GAL system 250 in block 432. The resulting automatically-labeled seed is then stored in the repository of annotated seeds 408. The process is continued until some stopping criteria are met. In various embodiments, the stopping criteria used to discontinue operation of the GAL system 250 is a matter of design choice.

From the foregoing, skilled practitioners of the art will recognize that a preponderance of negative instances in the repository of unannotated seeds and instances 428 will likely result in a corresponding preponderance of instances being automatically annotated with negative labels by the GAL system 250. Consequently, the number of interaction cycles needed to manually annotate seeds would be reduced, thereby allowing improved utilization of time by the user 402. Those of skill in the art will likewise recognize that the amount of training data needed would be reduced, as well as reducing the time and cost for information domain adaptation.

FIG. 5 is a generalized flowchart of the operation of a greedy active learner (GAL) system implemented in accordance with an embodiment of the invention to reduce user interaction when performing a Natural Language Processing (NLP) task, such as text categorization. In this embodiment, greedy active learning operations are begun in step 502, followed by the receipt of an unannotated corpus of source input in step 504. In various embodiments, the unannotated source input may be a corpus of content stored in a single, centralized datastore, or alternatively, distributed across multiple data stores. In certain embodiments, the unannotated source input may include a stream of data, such as a newsfeed, that is received as it is produced or made available for consumption. In these embodiments, the unannotated source input may include human readable text, metadata associated with a text, a graphics file, an audio file, a video file, or some combination thereof.

In various embodiments, the unannotated source input is filtered in step 506 according to subject, source, date, time, or some combination thereof. In these embodiments, the method by which the unannotated is filtered is a design choice. Once received in step 504, and filtered in step 508, the unannotated source input is then stored in a repository of unannotated instances and seeds in step 508. An input category and associated query terms, described in greater detail herein, is then received in step 510 from a user 402, likewise described in greater detail herein.

A determination is then made in step 512 whether any annotated seeds relevant to the input category and query terms are available in a repository of annotated seeds. If not, a distributed Latent Semantic Analysis (LSA) model is used in step 514 to generate a LSA similarity score for each unannotated instance stored in the repository of unannotated instances and seeds. Then, in step 516, a search engine (e.g., a Lucene-based search engine) is likewise used to generate a search engine score for each unannotated instance stored in the repository of unannotated instances and seeds. The resulting LSA similarity and search engine scores, the input category, and any associated query terms are then processed in step 518 to rank the unannotated instances stored in the repository of unannotated instances and seeds. In certain embodiments, the LSA similarity and search engine scores, the input category, and any associated query terms are processed by a semantic search-based seed selector (SSSS) implemented to perform ranking operations.

However, if it was determined in step 512 that annotated seeds relevant to the input category and query terms are available, then a determination is made in step 520 whether the ratio of annotated seeds is imbalanced, as described in greater detail herein. If not, then the annotated seeds stored in the repository of annotated seeds are used in step 522 to train a supervised classifier, as described in greater detail herein, to select an unannotated candidate seed. Thereafter, the trained supervised classifier is used in step 524 to select an unannotated candidate seed from the repository of unannotated instances and seeds.

However, if it was determined in step 520 that the ratio of annotated seeds is imbalanced, then a determination is made in step 526 whether there is an imbalance of negatively annotated seeds. If so, or after ranking operations are completed in step 518, then the SSS is used in step 524 to select the highest-ranked unannotated instance stored in the repository of unannotated instances and seeds as a candidate seed. A determination is then made in step 526 whether to request a user (e.g., an oracle) to annotate the candidate seed.

However, if it was determined in step 526 that there was not an imbalance of negatively-annotated seeds stored in the repository of unannotated instances and seeds, then the SSSS is used in step 528 to select the lowest-ranked unannotated seed stored in the repository of unannotated instances and seeds as the candidate seed. A determination is then made in step 530 whether the candidate seed should be automatically annotated with a negative label by the GAL system. If not, or if it was determined in step 526 to request a user to annotate the candidate seed, or if the candidate seed was selected by a supervised classifier in step 524, then the candidate seed is provided to a user for annotation in step 532.

A determination is then made in step 536 whether the user considers the candidate seed a positive instance. If so, then the user annotates the candidate seed with a positive label in step 538. If not, then the user annotates the candidate seed with a negative label in step 538. However, if it was determined in step 526 to not request a user to annotate the candidate seed, then the candidate seed is automatically annotated by the GAL system with a positive label in step 534. Likewise, if it was determined in step 530 to automatically label the candidate seed with a negative label, then it is so labeled by the GAL system in step 542. Once annotation operations are completed in steps 534, 538, 540 or 542, then the annotated seed is stored in the repository of annotated seeds in step 544.

A determination is then made in step 546 whether to provide the ranked source input to the user. If so, then LSA and search engine scores, the input category and associated query terms, and seed annotation metadata (i.e., positive and negative labels) are used in step 548 to rank relevant source input. The resulting relevant source input is then provided in ranked order to the user in step 550. For example, annotated seeds may be provided in their ranked order first, followed by unannotated instances provided in their ranked order.

Thereafter, or if it was determined in step 546 not to provide ranked source input to the user, then a determination is made in step 552 whether to end greedy active learning operations. If not, then a determination is made in step 554 whether to revise the input category or query terms. If so, then revisions to the input category or query terms are received from the user in step 556. Thereafter, of if it was determined not to revise input category or query terms in step 554, the process is continued, proceeding with step 512. However, is it was determined in step 552 to end greedy active learning operations, then they are ended in step 558.

Figure 6:
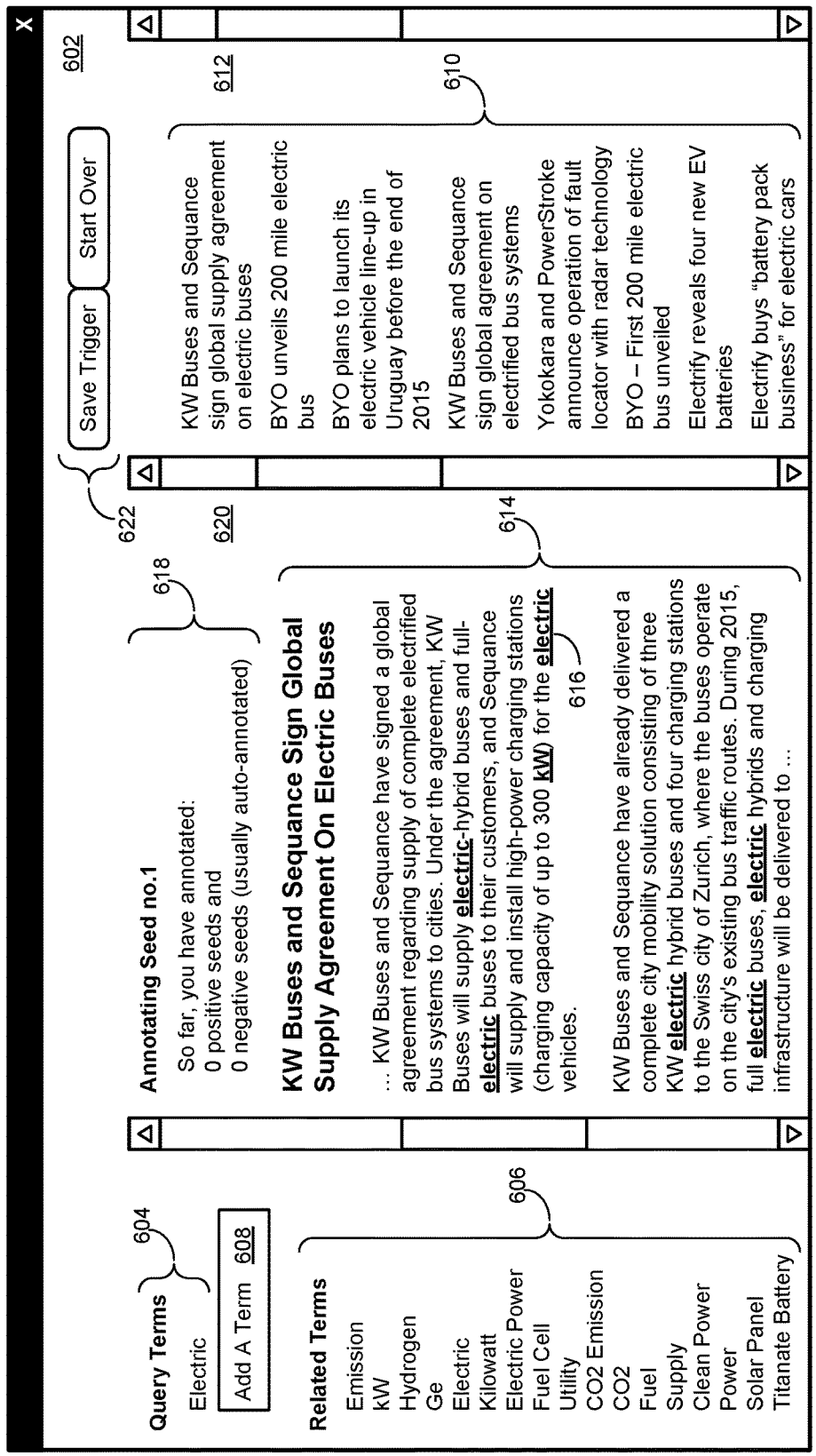
FIG. 6 shows the display of a GAL system within a user interface (UI)

FIG. 6 shows the display of a greedy active learner (GAL) system within a user interface (UI) implemented in accordance with an embodiment of the invention for reducing user interaction when training a system for a Natural Language Processing (NLP) task, such as searching a corpus of unannotated source input. In this embodiment, a UI window 602 includes the display of current query terms 604 and related terms 606, such as associated query terms described in greater detail herein. The UI window also includes a seed annotation summary area 618 and command buttons 622 for saving, or clearing, a query trigger.

As used herein, a query trigger broadly refers to a query term provided by a user that results in learning operations being performed by a GAL system when it is encountered within a body of source input. In general, a query trigger is encountered whenever new source input is made available to the GAL system, such as in a streaming news feed. However, a query trigger may also be encountered in the course of a user search. In one embodiment, the query trigger may be encountered as a result of a web crawler indexing a web site.

In various embodiments, as described in greater detail herein, a user may decide to revise or add an input category, a query term 604, or some combination thereof. In these embodiments, the input category and query terms 604 are used by a GAL system to perform learning operations, likewise described in greater detail herein, resulting in the ranking of source input. For example, as shown in FIG. 6, ranked instances of source input 610 are displayed in a UI sub-window 612. Likewise, the top-ranked instance 614 of the ranked instances of source input 610 is displayed in a UI sub-window 620, with various query terms 616 indicated therein by the application of a visual attribute, such as highlighting, bolding, underlining and so forth.

Figure 7:
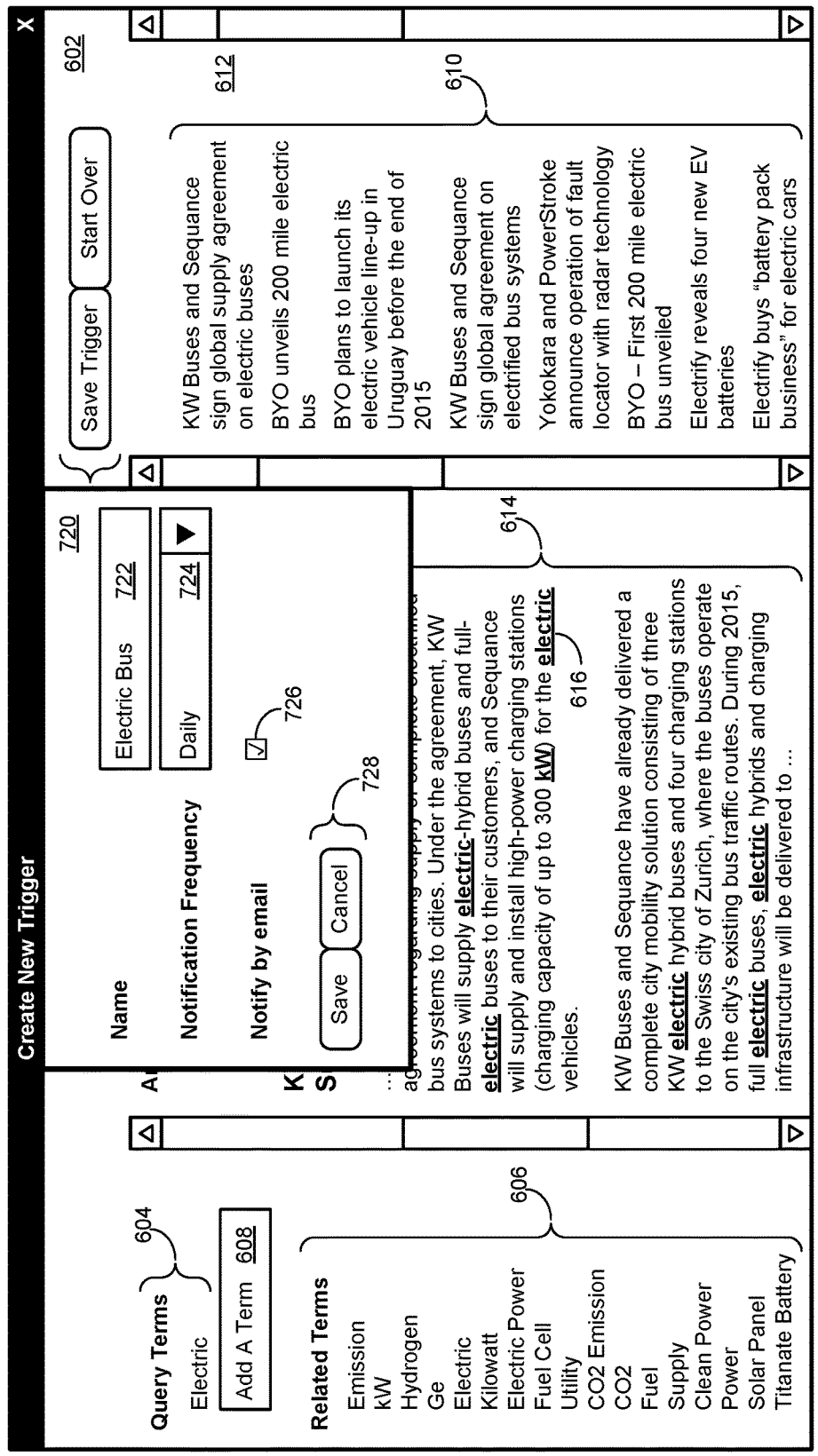
FIG. 7 shows the display of a GAL system trigger creation dialog box within a UI window.

FIG. 7 shows the display of a greedy active learner (GAL) system query term creation dialog box within a user interface (UI) window implemented in accordance with an embodiment of the invention reducing user interaction when training a system for a Natural Language Processing (NLP) task, such as searching a corpus of unannotated source input.

In this embodiment, a "Create New Trigger" 720 sub-window allows the user to enter a query trigger, described in greater detail herein, in a data entry field 722. Likewise, a "Notification Frequency" drop down 724 menu allows the user to select the how often the query trigger is used to initiate learning operations on newly-received source input. As shown in FIG. 7, the "Create New Trigger" 720 sub-window also includes a "Notify by email" 726 selection box, as well as "Save" and "Cancel" 728 command buttons.

In various embodiments, the various data entry fields, drop-down menus, and command buttons displayed within the UI sub-window 720 are implemented to allow a user to revise their search criteria within existing, and newly-received, source input. In certain of these embodiments, the user is provided the ability to determine how often learning operations are performed, as well as how they are notified once the learning operations are completed. From the foregoing, skilled practitioners of the art will recognize that the various embodiments described herein not only reduce user interaction when training a system for a Natural Language Processing (NLP) task, such as searching a corpus of unannotated source input, but also allows user to customize and continually adapt searches for their needs.

Although the present invention has been described in detail, it should be understood that various changes, substitutions and alterations can be made hereto without departing from the spirit and scope of the invention as defined by the appended claims.

What is claimed is:

1. A computer-implemented method for active machine learning, comprising:
   determining a ratio of positive instances to negative instances in a collection of labeled instances associated with an input category, the positive instances and the negative instances being annotated to indicate whether an instance is a positive instance associated with the input category or a negative instance associated with the input category, the positive instances and the negative instances being used for learning by an active learning system, the ratio of positive instances to negative instances providing an indication of whether the collection of labeled instances associated with an input category is imbalanced beyond a particular threshold;
   determining that a first threshold for negative instances is met, and selecting a first instance for annotation from a collection of unlabeled instances, the collection of unlabeled instances providing an unlabeled training set, the first instance meeting a first threshold confidence level of being a positive instance of the input category; and
   determining that a second threshold for positive instances is met, and selecting a second instance for annotation from the collection of unlabeled instances, the second instance meeting a second threshold confidence level of being a negative instance of the input category; and wherein
   the selecting the first instance and the selecting the second instance are performed via a semantic search-based seed selector, the semantic search-based seed selector taking into consideration a Latent Semantic Analysis similarity score and a search engine score in combination to rank unannotated instances stored in a repository of unannotated instances, the search engine score being generated by a Lucene-based search engine; and,
   the selecting the first instance for annotation and the second instance for annotation facilitating greedy active learning, the greedy active learning maintaining a balance of positive instances and negative instances for labeling, the greedy active learning preventing an imbalanced distribution of positive instances and negative instances being selected from the unlabeled training set, the greedy active learning being used when performing a natural language processing task.

2. The method of claim 1, wherein:
   the first instance is an unlabeled instance having a highest confidence level of being a positive instance for the input category; and
   the second instance is an unlabeled instance having a highest confidence level of being a negative instance for the input category.

3. The method of claim 1, wherein:
   the first threshold is a ratio of a number of labeled negative instances divided by a number of labeled positive instances; and
   the second threshold is a ratio of a number of labeled positive instances divided by a number of labeled negative instances.

4. The method of claim 1, wherein:
   a classification of an unlabeled instance as a negative or a positive instance is performed by a semantic search technique.

5. The method of claim 4, wherein:
   the semantic search technique is performed by using distributional semantics and a search engine.

6. The method of claim 4, wherein:
   the classification is also performed in part by a machine learning based supervised classifier.

7. The method of claim 1, further comprising:
   annotating the first instance with a positive label, the annotated first instance added to the collection of labeled instances; and
   annotating the second instance with a negative label, the annotated second instance added to the collection of labeled instances.

8. The method of claim 1, further comprising:
   using the collection of annotated instances to train a machine learning system when a relatively equal number of positive instances and negative instances have been annotated.

9. A system comprising:
   a processor;
   a data bus coupled to the processor; and
   a computer-usable medium embodying computer program code, the computer-usable medium being coupled to the data bus, the computer program code used for active machine learning and comprising instructions executable by the processor and configured for:
   determining a ratio of positive instances to negative instances in a collection of labeled instances associated with an input category, the positive instances and the negative instances being annotated to indicate whether an instance is a positive instance associated with the input category or a negative instance associated with the input category, the positive instances and the negative instances being used for learning by an active learning system, the ratio of positive instances to negative instances providing an indication of whether the collection of labeled instances associated with an input category is imbalanced beyond a particular threshold;
   selecting a first instance for annotation from a collection of unlabeled instances when a first threshold for negative instances is met, the collection of unlabeled instances providing an unlabeled training set, the first instance meeting a first threshold confidence level of being a positive instance of the input category; and
   selecting a second instance for annotation from the collection of unlabeled instances when a second threshold for positive instances is met, the second instance meeting a second threshold confidence level of being a negative instance of the input category; and wherein
   the selecting the first instance and the selecting the second instance are performed via a semantic search-based seed selector, the semantic search-based seed selector taking into consideration a Latent Semantic Analysis similarity score and a search engine score in combination to rank unannotated instances stored in a repository of unannotated instances, the search engine score being generated by a Lucene-based search engine; and,
   the selecting the first instance for annotation and the second instance for annotation facilitating greedy active learning, the greedy active learning maintaining a balance of positive instances and negative instances for labeling, the greedy active learning preventing an imbalanced distribution of positive instances and negative instances being selected from the unlabeled training set, the greedy active learning being used when performing a natural language processing task.

10. The system of claim 9, wherein:
    the first instance is an unlabeled instance having a highest confidence level of being a positive instance for the input category; and the second instance is an unlabeled instance having a highest confidence level of being a negative instance for the input category.

11. The system of claim 9, wherein:
the first threshold is a ratio of a number of labeled negative instances divided by a number of labeled positive instances; and
the second threshold is a ratio of a number of labeled positive instances divided by a number of labeled negative instances.

12. The system of claim 9, wherein:
a classification of an unlabeled instance as a negative or a positive instance is performed by a semantic search technique.

13. The system of claim 12, wherein:
the semantic search technique is performed by using distributional semantics and a search engine.

14. The system of claim 12, wherein:
the classification is also performed in part by a machine learning based supervised classifier.

15. The system of claim 9, further comprising:
annotating the first instance with a positive label, the annotated first instance added to the collection of labeled instances; and
annotating the second instance with a negative label, the annotated second instance added to the collection of labeled instances.

16. The system of claim 9, further comprising:
using the collection of annotated instances to train a machine learning system when a relatively equal number of positive instances and negative instances have been annotated.

17. A non-transitory, computer-readable storage medium embodying computer program code, the computer program code comprising computer executable instructions configured for:
determining a ratio of positive instances to negative instances in a collection of labeled instances associated with an input category, the positive instances and the negative instances being annotated to indicate whether an instance is a positive instance associated with the input category or a negative instance associated with the input category, the positive instances and the negative instances being used for learning by an active learning system, the ratio of positive instances to negative instances providing an indication of whether the collection of labeled instances associated with an input category is imbalanced beyond a particular threshold;
selecting a first instance for annotation from a collection of unlabeled instances when a first threshold for negative instances is met, the collection of unlabeled instances providing an unlabeled training set, the first instance meeting a first threshold confidence level of being a positive instance of the input category; and
selecting a second instance for annotation from the collection of unlabeled instances when a second threshold for positive instances is met, the second instance meeting a second threshold confidence level of being a negative instance of the input category; and wherein
the selecting the first instance and the selecting the second instance are performed via a semantic search-based seed selector, the semantic search-based seed selector taking into consideration a Latent Semantic Analysis similarity score and a search engine score in combination to rank unannotated instances stored in a repository of unannotated instances, the search engine score being generated by a Lucene-based search engine; and,
the selecting the first instance for annotation and the second instance for annotation facilitating greedy active learning, the greedy active learning maintaining a balance of positive instances and negative instances for labeling, the greedy active learning preventing an imbalanced distribution of positive instances and negative instances being selected from the unlabeled training set, the greedy active learning being used when performing a natural language processing task.

18. The non-transitory, computer-readable storage medium of claim 17, wherein:
the first instance is an unlabeled instance having a highest confidence level of being a positive instance for the input category; and
the second instance is an unlabeled instance having a highest confidence level of being a negative instance for the input category.

19. The non-transitory, computer-readable storage medium of claim 17, wherein:
the first threshold is a ratio of a number of labeled negative instances divided by a number of labeled positive instances; and
the second threshold is a ratio of a number of labeled positive instances divided by a number of labeled negative instances.

20. The non-transitory, computer-readable storage medium of claim 17, wherein:
a classification of an unlabeled instance as a negative or a positive instance is performed by a semantic search technique.

21. The non-transitory, computer-readable storage medium of claim 20, wherein:
the semantic search technique is performed by using distributional semantics and a search engine.

22. The non-transitory, computer-readable storage medium of claim 20, wherein:
the classification is also performed in part by a machine learning based supervised classifier.

23. The non-transitory, computer-readable storage medium of claim 17, further comprising:
annotating the first instance with a positive label, the annotated first instance added to the collection of labeled instances; and
annotating the second instance with a negative label, the annotated second instance added to the collection of labeled instances.

24. The non-transitory, computer-readable storage medium of claim 17, further comprising:
using the collection of annotated instances to train a machine learning system when a relatively equal number of positive instances and negative instances have been annotated.

25. The non-transitory, computer-readable storage medium of claim 17, wherein the computer executable instructions are deployable to a client system from a server system at a remote location.

26. The non-transitory, computer-readable storage medium of claim 17, wherein the computer executable instructions are provided by a service provider to a user on an on-demand basis.

* * * * *